(12) United States Patent
Yang et al.

(10) Patent No.: US 11,632,839 B2
(45) Date of Patent: Apr. 18, 2023

(54) LIGHTING APPARATUS

(71) Applicant: LEEDARSON LIGHTING CO., LTD., Fujian (CN)

(72) Inventors: Shixue Yang, Fujian (CN); Junjie Guo, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/589,806

(22) Filed: Jan. 31, 2022

(65) Prior Publication Data
US 2022/0248514 A1 Aug. 4, 2022

(30) Foreign Application Priority Data
Jan. 29, 2021 (CN) .......................... 202110130588.2

(51) Int. Cl.
*H05B 45/345* (2020.01)
*H05B 45/44* (2020.01)
*H05B 45/37* (2020.01)

(52) U.S. Cl.
CPC ........... *H05B 45/345* (2020.01); *H05B 45/37* (2020.01); *H05B 45/44* (2020.01)

(58) Field of Classification Search
CPC ...... H05B 45/10; H05B 45/345; H05B 45/37; H05B 45/40; H05B 45/44; H05B 47/10
See application file for complete search history.

(56) References Cited

U.S. PATENT DOCUMENTS

2019/0313498 A1* 10/2019 Chen ...................... H05B 45/10

* cited by examiner

*Primary Examiner* — Jimmy T Vu
(74) *Attorney, Agent, or Firm* — Chun-Ming Shih; Lanway IPR Services

(57) ABSTRACT

A lighting apparatus includes a rectifier, a loading module, a constant current switch module and a current supplemental module. The rectifier is connected to an output of the AC power for receiving an AC signal to convert the AC signal to a positive wave signal. The loading module includes multiple loading units. The loading module is disposed on the output of the rectifier. The constant current switch module is connected to output of each loading unit and to control the working cycle of each loading unit so as to ensure a total passing current of the loading module is opposite in phase to the positive wave signal to keep output power constant. The current supplemental module supplies output current to the loading module when the positive wave signal is in sufficient to drive the loading module.

20 Claims, 6 Drawing Sheets

LIGHTING APPARATUS

FIELD

The present invention is related to a lighting apparatus, and more particularly related to a lighting apparatus with a stable power input.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Light devices are widely used in various areas. For some places, the electricity supply is stable, but this is not true in all areas.

Therefore, it is useful to design a driver circuit that may converts the AC power to a stable driving current used for driving LED modules.

SUMMARY

In some embodiments, a lighting apparatus includes a rectifier, a loading module, a constant current switch module and a current supplemental module.

The rectifier is connected to an output of the AC power for receiving an AC signal to convert the AC signal to a positive wave signal.

The loading module includes multiple loading units.

The loading module is disposed on the output of the rectifier.

The constant current switch module is connected to output of each loading unit and to control the working cycle of each loading unit so as to ensure a total passing current of the loading module is opposite in phase to the positive wave signal to keep output power constant.

The current supplemental module is connected to the output of the rectifier and an input of the loading module.

The current supplemental module is charged the loading unit during the working cycle and supplies output current to the loading module when the positive wave signal is insufficient to drive the loading module.

In some embodiments, the constant current switch module includes multiple current limit modules respectively corresponding to the multiple loading units.

In some embodiments, the current limit module is connected to an output of one corresponding loading unit.

In some embodiments, the constant current switch module sequentially switches the switches of the current limit modules to convert the total passing current to a lowering ladder signal when the positive wave signal is at a rising period.

In some embodiments, the constant current switch module sequentially switches the current limit modules to convert the total passing current of the loading module to a rising ladder signal when the positive wave signal is lowering.

In some embodiments, the input of each current limit module is connected an output of a corresponding loading unit to form a working loop with the loading unit.

In some embodiments, the current limit module includes a current source on the working loop, a switch unit and a voltage detector.

The voltage detector turns on or turns off the switch unit according to a detected voltage of the working loop.

In some embodiments, the current supplemental module includes a first capacitor.

An input of the first capacitor is connected between the rectifier and the loading module.

In some embodiments, the current supplemental module includes a charging current source series connected to a back end of the first capacitor.

In some embodiments, the current supplemental module includes capacitor charging unit.

The capacitor charging unit includes a voltage detector and a switch unit.

The voltage detector detects an input voltage of the loading module.

The switch unit is series connected to a back end of the charging current source.

In some embodiments, the voltage detector determines whether to turn on the switch unit to charge the first capacitor according to the input voltage of the loading module.

In some embodiments, the current supplemental module includes a capacitor power supply unit.

The capacitor power supply unit includes a switch control loop and a current detector.

The current detector detects a passing current to the first loading unit and determines to turn on or to turn off the switch control loop to supply power to the loading unit.

In some embodiments, the current supplemental module includes a second capacitor.

The second capacitor is connected between the rectifier and the loading module.

In some embodiments, the current supplemental module includes a back-to-back NMOS circuit series connected with the second capacitor.

In some embodiments, the current supplemental module includes a capacitor charging-discharging control unit connected to a gate of the back-to-back NMOS circuit to control turn-on or turn-off of the back-to-back NMOS circuit.

In some embodiments, the capacitor charging-discharging control unit detects a passing current through the first loading unit and determines to turn on or to turn off the back-to-back NMOS circuit according to the passing current.

In some embodiments, the capacitor charging-discharging control unit charges the second capacitor or enables the second capacitor to supply power to the loading units.

In some embodiments, the loading units respectively has at least one LED module.

In some embodiments, the loading unit includes a wireless circuit.

In some embodiments, the wireless circuit is further coupled to a third capacitor.

DETAILED DESCRIPTION

Driver circuits are important in the design of LED light devices. If the current supplied to the LED modules is not stable, the LED modules are easily to be damaged or their life spans are significantly affected. In addition, people expect LED light devices to emit stable light.

LED modules work in DC (Direct Current) mode. However, most indoor power source is AC (Alternating Current) mode. Therefore, it is found helpful to decrease variant of the AC power on driving LED modules.

Figure 1:
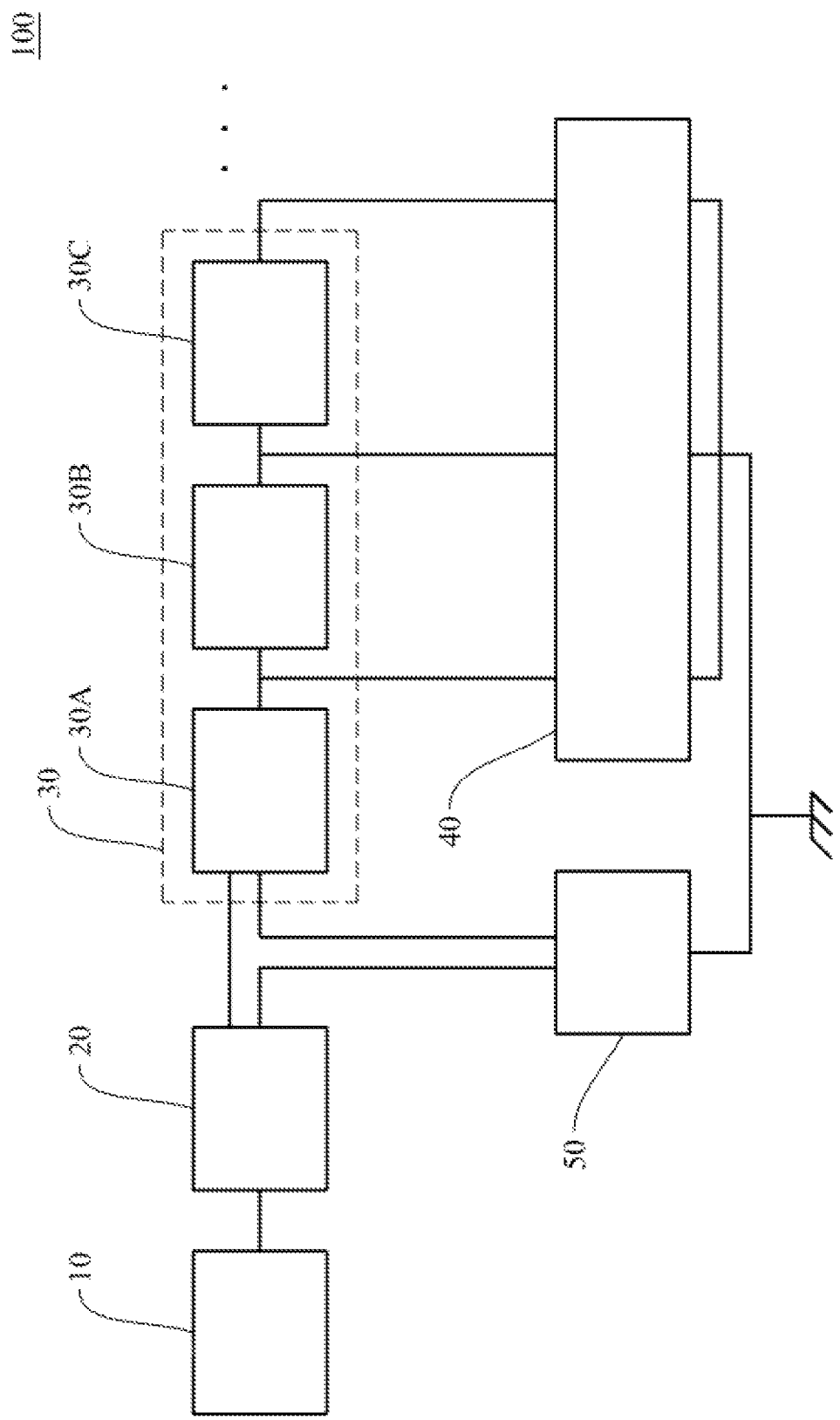
FIG. 1 illustrates a circuit architecture diagram of a lighting apparatus embodiment.
Figure 2:
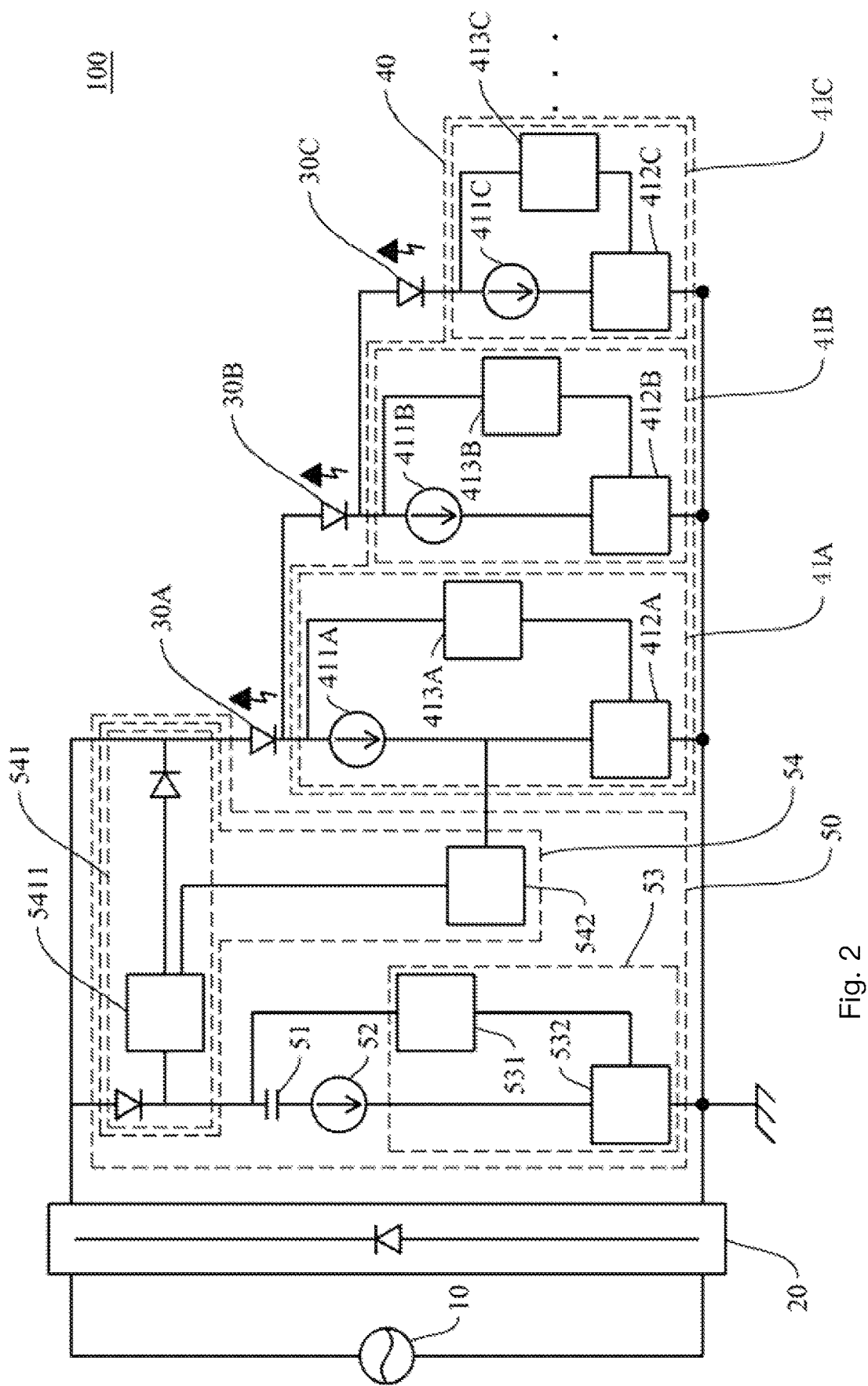
FIG. 2 illustrates a circuit example.

Please refer to FIG. 1 and FIG. 2, which illustrate a lighting apparatus embodiment.

In this embodiment, a full cycle loading driver system used in a lighting apparatus 100 is disclosed for providing driving currents to a lighting apparatus, e.g. a LED light device.

The lighting apparatus 100 receives an AC power 10 and includes a rectifier 20, a loading module 20, a constant current switch module 40, and a current supplemental module 50.

The rectifier 20 is connected to a output of the AC power 10 to receive an AC signal. The rectifier 20 converts the AC signal to a positive wave signal. The rectifier 20 may be a full wave rectifier, a half wave rectifier, a bridge rectifier or other similar devices.

The loading module 30 is placed at output of the rectifier 30. The loading module 30 includes multiple loading units 30A-30C connected in series. An output of each loading unit is connected to a current limit module. Each current limit module has a voltage conductive threshold and a working cycle dispatched to each current limit module based on the positive wave signal.

The constant current switch module 40 is connected to multiple loading units 30A-30C. The constant current switch module 40 controls the working cycle of the multiple loading units and ensures a total passing current of the loading module 30 is opposite to the phase of the positive wave signal to output a constant power.

In some embodiments, the constant current switch module 40 includes multiple current limit modules 41A-41C. The current limit module corresponds to the loading unit with a one-to-one mapping. The input of each current limit module is connected to an output of a corresponding loading unit to form a working loop with the corresponding loading unit.

The constant current switch module 40 sequentially switches the current limit modules 41A to 41C to convert the total passing current of the loading module 30 to a lowering ladder signal when the positive wave signal is at rising period and to convert the total passing current of the loading module 30 to a rising ladder signal when the positive wave signal is at lowering period.

In some embodiments, an input of the current limit module 41A is connected between the loading unit 30A and the loading unit 30B so as to form a first ladder loop with the loading unit 30A.

The input of the current limit module 41B is connected between the loading unit 30B and the loading unit 30C so as to form a second ladder loop with the loading unit 30B.

The input of the current limit module 41C is connected to the output of the loading unit 30C (or connected between the loading unit 30C and next loading unit, depending on ladder numbers) so as to form a third ladder loop. Each independent ladder loop respectively correspond to a stage of the ladder signals.

The current limit module 41A includes a current source 411A, a switch unit 312A and a voltage detector 413A. The current source 411A is disposed on corresponding working loop. The voltage detector 413A turns on or turns off the switch unit 412A according to the working loop.

The current limit module 41B includes a current source 411B, a switch unit 412B and a voltage detector 413B. The current limit module 41C includes a current source 411C, a switch unit 412C and a voltage detector 413C.

The ladder loop numbers may be varied depending on different design requirements.

The current supplemental module is connected to an output of the rectifier 20 and an input of the loading module 30.

The current supplemental module is charged during the working cycle of each loading unit and supplies power to the loading module 30 when the positive wave signal is insufficient to provide power to the loading module 30. The period that the current supplemental module supplies power mainly refers to the valley bottom in FIG. 4, e.g. section Ttr.

In some embodiments, the current supplemental module 50 has a first capacitor 51, a charging current source 52, a capacitor charging unit 53, and a capacitor power supply unit 54.

The input of the capacitor 51 is connected between the rectifier 20 and the loading module 30. The charging current source is series connected to the back end of the first capacitor 51.

The capacitor charging unit 50 includes a voltage detector 531 and a switch unit 532. The voltage detector 531 detects an input voltage of the loading module 30. The switch unit 532 is series connected to a back end of the charging current source 52. The voltage detector 5321 determines whether to turn on the switch unit 532 to charge the first capacitor 51 according to a corresponding input voltage of the working cycle.

The current detector 542 detects a passing current Ith1 of a current limit module 41A for the first loading unit, i.e. the loading unit 30A, and determines whether to turn on the switch 5411 of the switch control loop 541 to supply power to the loading unit 30A. In some embodiments, multiple loading units may be supplied with power at the same time.

Figure 3:
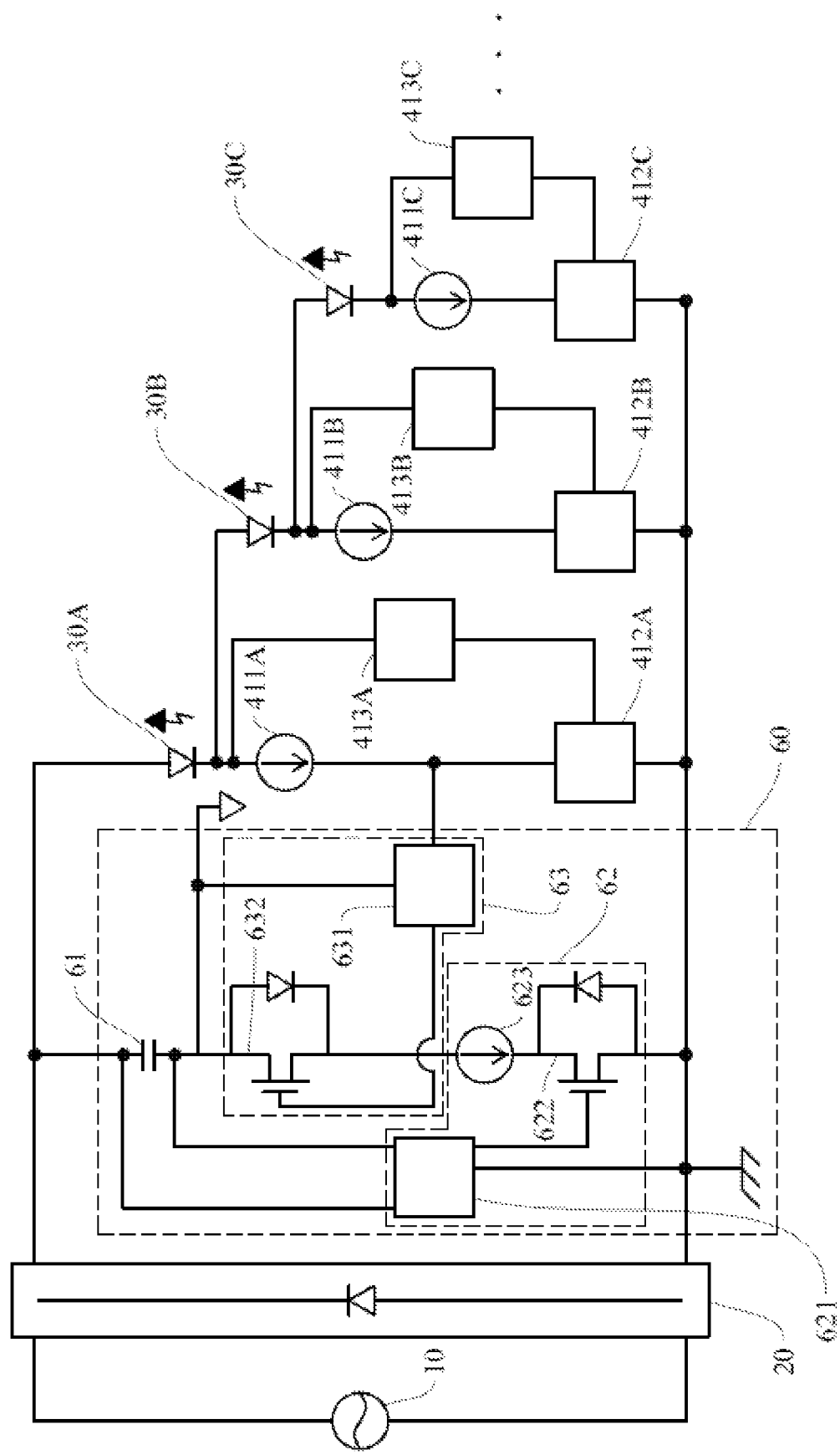
FIG. 3 illustrates another circuit example.

The current supplemental module 50 may be modified to another similar circuit. The following example in FIG. 3 shows such variant example.

In this embodiment, the current supplement module 60 includes a second capacitor 61, a back-to-back NMOS circuit and a capacitor charging-discharging control unit. The second capacitor 61 is connected between the rectifier 20 and the loading module 30.

The back-to-back NMOS circuit is series connected to the second capacitor 61. The capacitor charging-discharging control unit detects the passing current (Ith1) of the current limit module 41A for the first loading unit 30A to determine whether to supply power to the loading unit 30A with the second capacitor 61.

The current supplemental module 60 includes a capacitor 61, a charging control module 62 and a power supply module 63. The input of the second capacitor 61 is connected between the rectifier 20 and the loading module 30.

The back-to-back NMOS circuit is a charging control module 62 that includes a first voltage detector 621, a first control switch 622, and a first current source 623. The first voltage detector 621 is connected to the gate of the first control switch 622 to turn on or to turn off the first control switch.

The power supply control module 63 includes a second voltage detector 631 and a second control switch 632. The first control switch 622 and the second control switch 632 are connected in series. The drain of the first control switch 622 is connected to the drain of the second control switch 632 to form a back-to-back structure.

Figure 4:
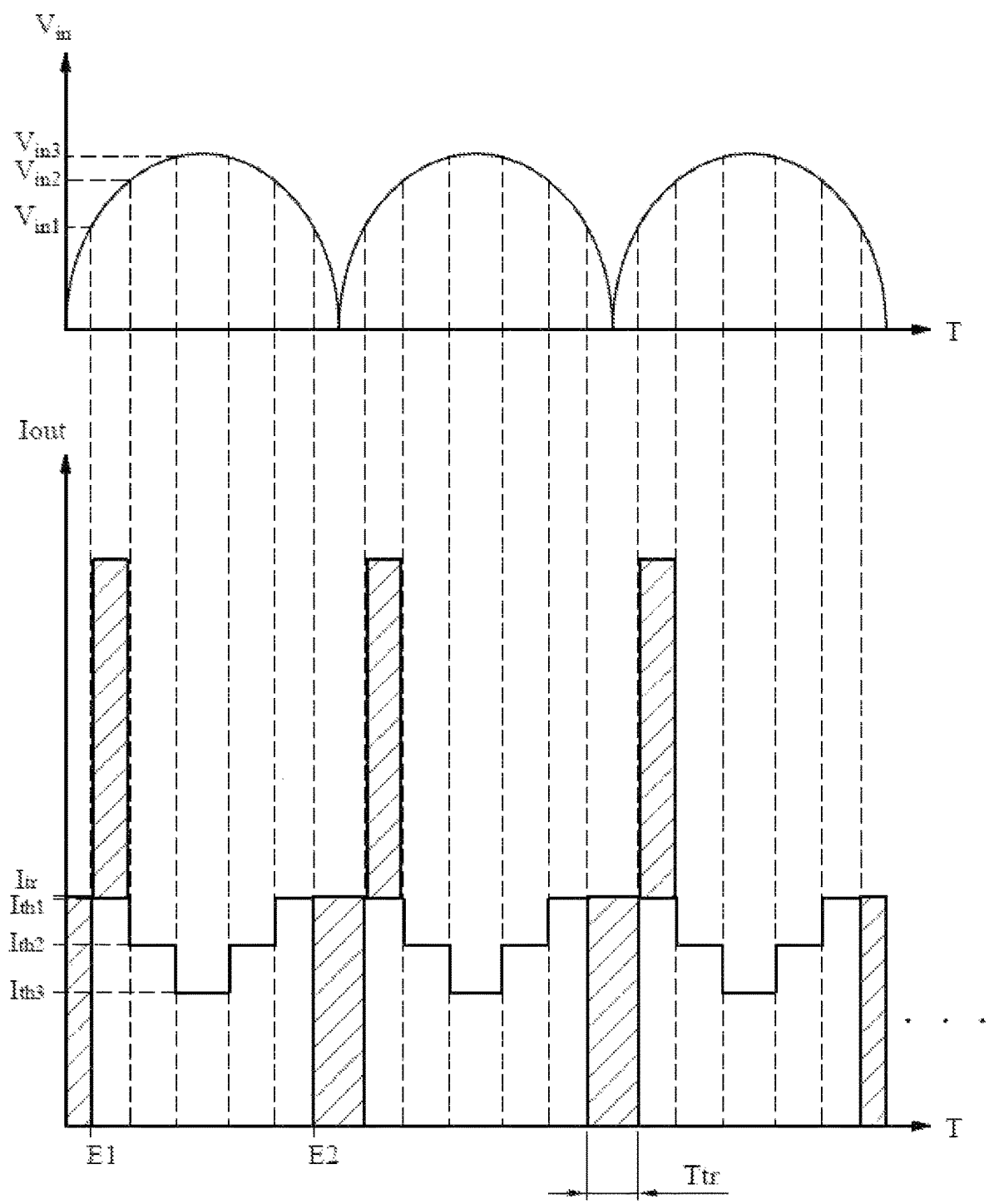
FIG. 4 illustrates a working cycle diagram.
Figure 5:
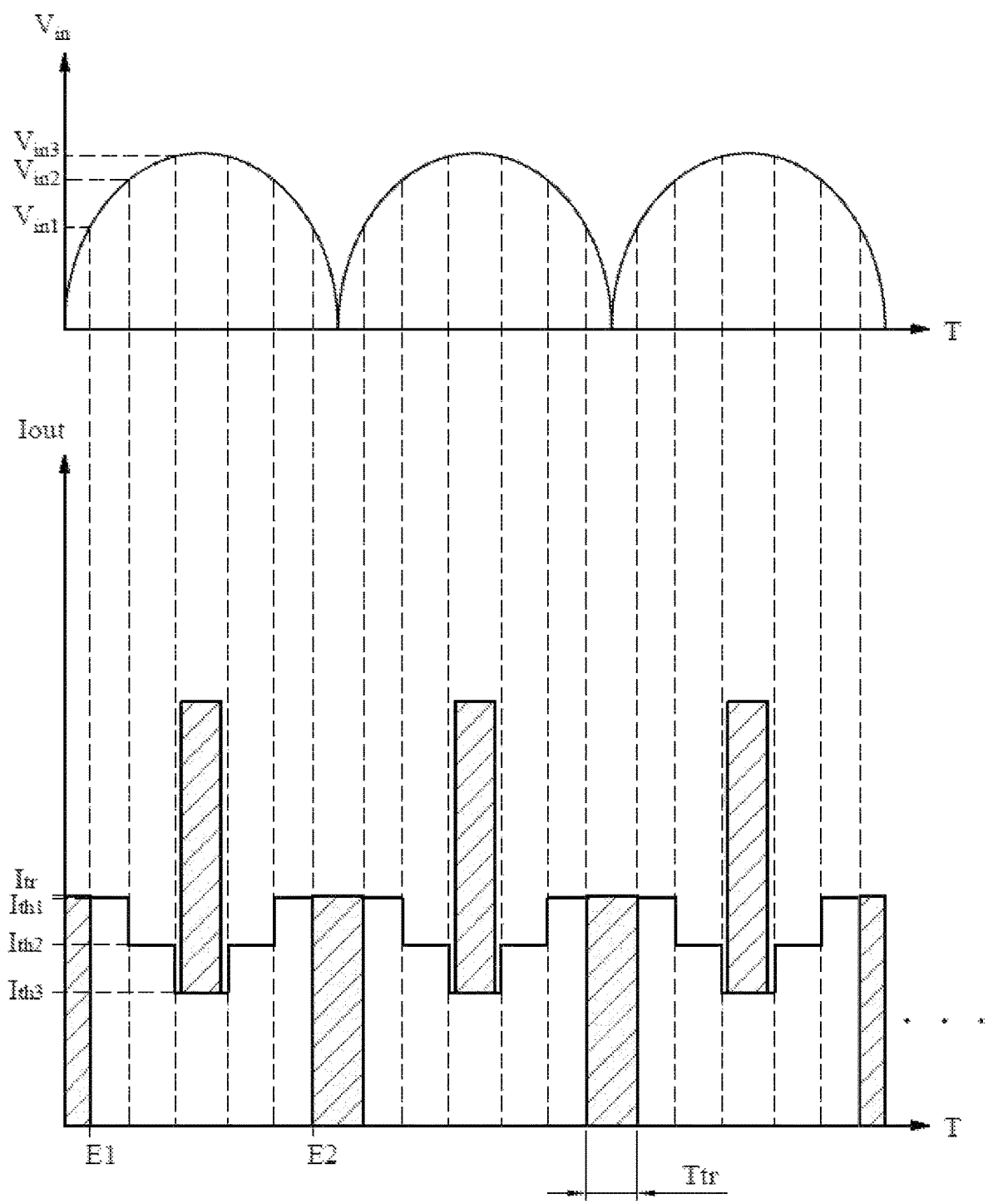
FIG. 5 illustrates another working cycle diagram.
Figure 6:
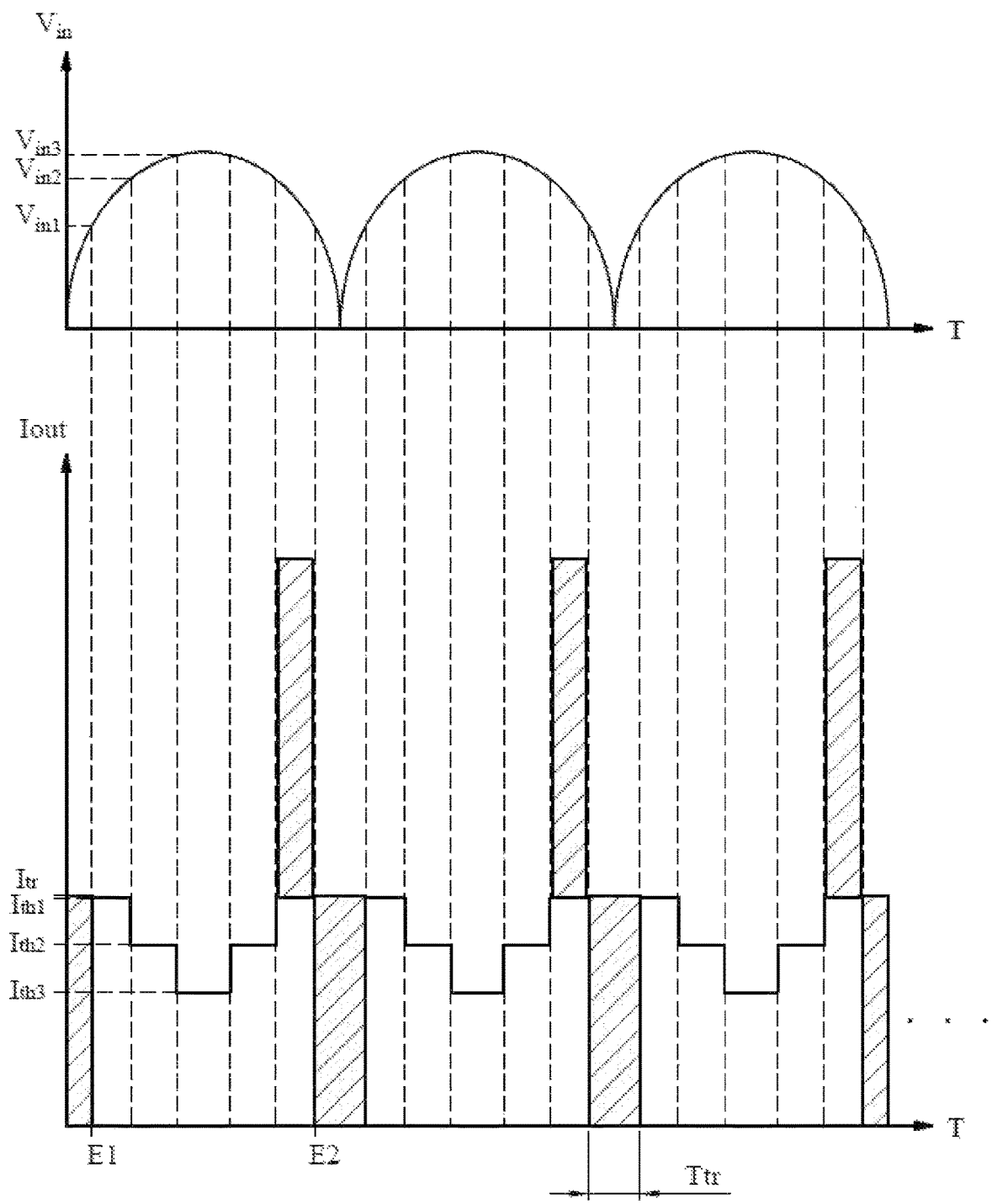
FIG. 6 illustrates another working cycle diagram.

Please refer to FIG. 4, FIG. 5 and FIG. 6 which show a relation between positive wave signals and the ladder signal.

The positive wave signal refers to the input voltage after the rectifier 20. The ladder signal refers to a current signal corresponding to the positive wave signal.

In FIG. 4, the ladder signals are triggered by the current limit module 41A, 41B and 41C. When the positive wave signal is rising, the total passing current through the loading module 30 is decreased gradually. When the positive wave signal is lowering the total passing current is increased gradually.

The positive wave signals are compared with the first threshold Vin1, the second threshold Vin2, the third threshold Vin3 sequentially and outputs a corresponding ladder wave signal (current).

When the positive wave signal is lower, a supplemental current is provided by such circuit.

In FIG. 5, in addition to charge the first capacitor 51 during the rising stage of the positive wave signal, other working cycles may also be used for charging the first capacitor.

FIG. 6 shows that the charging to the capacitor can even be performed when the positive wave signal is lowering.

In some embodiments, a lighting apparatus includes a rectifier, a loading module, a constant current switch module and a current supplemental module.

The rectifier is connected to an output of the AC power for receiving an AC signal to convert the AC signal to a positive wave signal.

The loading module includes multiple loading units.

The loading module is disposed on the output of the rectifier.

The constant current switch module is connected to output of each loading unit and to control the working cycle of each loading unit so as to ensure a total passing current of the loading module is opposite in phase to the positive wave signal to keep output power constant.

The current supplemental module is connected to the output of the rectifier and an input of the loading module.

The current supplemental module is charged the loading unit during the working cycle and supplies output current to the loading module when the positive wave signal is in sufficient to drive the loading module.

In some embodiments, the constant current switch module includes multiple current limit modules respectively corresponding to the multiple loading units.

In some embodiments, the current limit module is connected to an output of one corresponding loading unit.

In some embodiments, the constant current switch module sequentially switches the switches of the current limit modules to convert the total passing current to a lowering ladder signal when the positive wave signal is at a rising period.

In some embodiments, the constant current switch module sequentially switches the current limit modules to convert the total passing current of the loading module to a rising ladder signal when the positive wave signal is lowering.

In some embodiments, the input of each current limit module is connected an output of a corresponding loading unit to form a working loop with the loading unit.

In some embodiments, the current limit module includes a current source on the working loop, a switch unit and a voltage detector.

The voltage detector turns on or turns off the switch unit according to a detected voltage of the working loop.

In some embodiments, the current supplemental module includes a first capacitor.

An input of the first capacitor is connected between the rectifier and the loading module.

In some embodiments, the current supplemental module includes a charging current source series connected to a back end of the first capacitor.

In some embodiments, the current supplemental module includes capacitor charging unit.

The capacitor charging unit includes a voltage detector and a switch unit.

The voltage detector detects an input voltage of the loading module.

The switch unit is series connected to a back end of the charging current source.

In some embodiments, the voltage detector determines whether to turn on the switch unit to charge the first capacitor according to the input voltage of the loading module.

In some embodiments, the current supplemental module includes a capacitor power supply unit.

The capacitor power supply unit includes a switch control loop and a current detector.

The current detector detects a passing current to the first loading unit and determines to turn on or to turn off the switch control loop to supply power to the loading unit.

In some embodiments, the current supplemental module includes a second capacitor.

The second capacitor is connected between the rectifier and the loading module.

In some embodiments, the current supplemental module includes a back-to-back NMOS circuit series connected with the second capacitor.

In some embodiments, the current supplemental module includes a capacitor charging-discharging control unit connected to a gate of the back-to-back NMOS circuit to control turn-on or turn-off of the back-to-back NMOS circuit.

In some embodiments, the capacitor charging-discharging control unit detects a passing current through the first loading unit and determines to turn on or to turn off the back-to-back NMOS circuit according to the passing current.

In some embodiments, the capacitor charging-discharging control unit charges the second capacitor or enables the second capacitor to supply power to the loading units.

In some embodiments, the loading units respectively has at least one LED module.

In some embodiments, the loading unit includes a wireless circuit.

In some embodiments, the wireless circuit is further coupled to a third capacitor.

The design implements a full cycle current supply to loading units to prevent blinking or signal variant problems to enhance quality of LED light devices.

In some embodiments, a lighting apparatus includes a rectifier, a loading module, a constant current switch module and a current supplemental module.

The rectifier is connected to an output of the AC power for receiving an AC signal to convert the AC signal to a positive wave signal.

The loading module includes multiple loading units.

The loading module is disposed on the output of the rectifier.

The constant current switch module is connected to output of each loading unit and to control the working cycle of each loading unit so as to ensure a total passing current of the loading module is opposite in phase to the positive wave signal to keep output power constant.

The current supplemental module is connected to the output of the rectifier and an input of the loading module.

The current supplemental module is charged the loading unit during the working cycle and supplies output current to the loading module when the positive wave signal is insufficient to drive the loading module.

In some embodiments, the constant current switch module includes multiple current limit modules respectively corresponding to the multiple loading units.

In some embodiments, the current limit module is connected to an output of one corresponding loading unit.

In some embodiments, the constant current switch module sequentially switches the switches of the current limit modules to convert the total passing current to a lowering ladder signal when the positive wave signal is at a rising period.

In some embodiments, the constant current switch module sequentially switches the current limit modules to convert the total passing current of the loading module to a rising ladder signal when the positive wave signal is lowering.

In some embodiments, the input of each current limit module is connected an output of a corresponding loading unit to form a working loop with the loading unit.

In some embodiments, the current limit module includes a current source on the working loop, a switch unit and a voltage detector.

The voltage detector turns on or turns off the switch unit according to a detected voltage of the working loop.

In some embodiments, the current supplemental module includes a first capacitor.

An input of the first capacitor is connected between the rectifier and the loading module.

In some embodiments, the current supplemental module includes a charging current source series connected to a back end of the first capacitor.

In some embodiments, the current supplemental module includes capacitor charging unit.

The capacitor charging unit includes a voltage detector and a switch unit.

The voltage detector detects an input voltage of the loading module.

The switch unit is series connected to a back end of the charging current source.

In some embodiments, the voltage detector determines whether to turn on the switch unit to charge the first capacitor according to the input voltage of the loading module.

In some embodiments, the current supplemental module includes a capacitor power supply unit.

The capacitor power supply unit includes a switch control loop and a current detector.

The current detector detects a passing current to the first loading unit and determines to turn on or to turn off the switch control loop to supply power to the loading unit.

In some embodiments, the current supplemental module includes a second capacitor.

The second capacitor is connected between the rectifier and the loading module.

In some embodiments, the current supplemental module includes a back-to-back NMOS circuit series connected with the second capacitor.

In some embodiments, the current supplemental module includes a capacitor charging-discharging control unit connected to a gate of the back-to-back NMOS circuit to control turn-on or turn-off of the back-to-back NMOS circuit.

In some embodiments, the capacitor charging-discharging control unit detects a passing current through the first loading unit and determines to turn on or to turn off the back-to-back NMOS circuit according to the passing current.

In some embodiments, the capacitor charging-discharging control unit charges the second capacitor or enables the second capacitor to supply power to the loading units.

In some embodiments, the loading units respectively has at least one LED module.

In some embodiments, the loading unit includes a wireless circuit.

In some embodiments, the wireless circuit is further coupled to a third capacitor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus coupled to an AC power, comprising:
   a rectifier connected to an output of the AC power for receiving an AC signal to convert the AC signal to a positive wave signal;
   a loading module comprising multiple loading units, wherein the loading module is disposed on the output of the rectifier;
   a constant current switch module connected to output of each loading unit and to control the working cycle of each loading unit so as to ensure a total passing current of the loading module is opposite in phase to the positive wave signal to keep output power constant; and
   a current supplemental module connected to the output of the rectifier and an input of the loading module, wherein the current supplemental module is charged the loading unit during the working cycle and supplies output current to the loading module when the positive wave signal is in sufficient to drive the loading module.

2. The lighting apparatus of claim 1, wherein the constant current switch module comprises multiple current limit modules respectively corresponding to the multiple loading units.

3. The lighting apparatus of claim 2, wherein the current limit module is connected to an output of one corresponding loading unit.

4. The lighting apparatus of claim 3, wherein the constant current switch module sequentially switches the switches of the current limit modules to convert the total passing current to a lowering ladder signal when the positive wave signal is at a rising period.

5. The lighting apparatus of claim 4, wherein the constant current switch module sequentially switches the current limit modules to convert the total passing current of the loading module to a rising ladder signal when the positive wave signal is lowering.

6. The lighting apparatus of claim 5, wherein the input of each current limit module is connected an output of a corresponding loading unit to form a working loop with the loading unit.

7. The lighting apparatus of claim 6, wherein the current limit module comprises a current source on the working loop, a switch unit and a voltage detector, wherein the voltage detector turns on or turns off the switch unit according to a detected voltage of the working loop.

8. The lighting apparatus of claim 1, wherein the current supplemental module comprises a first capacitor, wherein an input of the first capacitor is connected between the rectifier and the loading module.

9. The lighting apparatus of claim 8, wherein the current supplemental module comprises a charging current source series connected to a back end of the first capacitor.

10. The lighting apparatus of claim 9, wherein the current supplemental module comprises capacitor charging unit, wherein the capacitor charging unit comprises a voltage detector and a switch unit, wherein the voltage detector detects an input voltage of the loading module, wherein the switch unit is series connected to a back end of the charging current source.

11. The lighting apparatus of claim 10, wherein the voltage detector determines whether to turn on the switch unit to charge the first capacitor according to the input voltage of the loading module.

12. The lighting apparatus of claim 11, wherein the current supplemental module comprises a capacitor power supply unit, wherein the capacitor power supply unit comprises a switch control loop and a current detector, wherein the current detector detects a passing current to the first loading unit and determines to turn on or to turn off the switch control loop to supply power to the loading unit.

13. The lighting apparatus of claim 1, wherein the current supplemental module comprises a second capacitor, wherein the second capacitor is connected between the rectifier and the loading module.

14. The lighting apparatus of claim 13, wherein the current supplemental module comprises a back-to-back NMOS circuit series connected with the second capacitor.

15. The lighting apparatus of claim 14, wherein the current supplemental module comprises a capacitor charging-discharging control unit connected to a gate of the back-to-back NMOS circuit to control turn-on or turn-off of the back-to-back NMOS circuit.

16. The lighting apparatus of claim 15, wherein the capacitor charging-discharging control unit detects a passing current through the first loading unit and determines to turn on or to turn off the back-to-back NMOS circuit according to the passing current.

17. The lighting apparatus of claim 16, wherein the capacitor charging-discharging control unit charges the second capacitor or enables the second capacitor to supply power to the loading units.

18. The lighting apparatus of claim 1, wherein the loading units respectively has at least one LED module.

19. The lighting apparatus of claim 1, wherein the loading unit comprises a wireless circuit.

20. The lighting apparatus of claim 19, wherein the wireless circuit is further coupled to a third capacitor.

* * * * *